(12) United States Patent
Prucnal et al.

(10) Patent No.: US 7,035,550 B2
(45) Date of Patent: Apr. 25, 2006

(54) ALL-OPTICAL, 3R REGENERATION USING THE SAGNAC AND MACH-ZEHNDER VERSIONS OF THE TERAHERTZ OPTICAL ASYMMETRIC DEMULTIPLEXER (TOAD)

(75) Inventors: Paul R. Prucnal, Princeton, NJ (US); Bing C. Wang, Mansfield Center, CT (US)

(73) Assignee: The Trustees of Princeton University, Princeton, NJ (US)

( * ) Notice: Subject to any disclaimer, the term of this patent is extended or adjusted under 35 U.S.C. 154(b) by 135 days.

(21) Appl. No.: 10/732,171

(22) Filed: Dec. 10, 2003

(65) Prior Publication Data

US 2005/0078350 A1 Apr. 14, 2005

Related U.S. Application Data

(60) Provisional application No. 60/432,360, filed on Dec. 10, 2002.

(51) Int. Cl.
*H04B 10/20* (2006.01)
(52) U.S. Cl. ...................................... 398/175
(58) Field of Classification Search ................ 398/175
See application file for complete search history.

(56) References Cited

U.S. PATENT DOCUMENTS 6,765,715 B1 * 7/2004 DiJaili et al. ............... 359/344
6,775,481 B1 * 8/2004 Janz et al. ................... 398/175
6,807,379 B1 * 10/2004 Brindel et al. .............. 398/175

FOREIGN PATENT DOCUMENTS

JP 2003249913 A * 9/2003

OTHER PUBLICATIONS

Wang, et al.; "Experimental Study on the Regeneration Capability of the Terahertz Optical Asymmetric Demutliplexer", Princeton University, J303 E-Quad, Princeton, NJ 08544, pp. 1-9.
Wang, et al.; "Pattern Dependent effect reduction in 3R regeneration using a three wavelength Sagnac interferometer", Princeton University, J303 E-Quad, Princeton, NJ 08544, pp. 1-3.
International Search Report issued for PCT/US2004/41495, dated Jun. 3, 2005.

* cited by examiner

*Primary Examiner*—Mark Hellner
(74) *Attorney, Agent, or Firm*—Fulbright&JaworskiLLP

(57) ABSTRACT

A system and method for regenerating optical signals comprising a clock recovery circuit coupled to a transmission line, a first optical gating device having an input port coupled to the transmission line and a clock port coupled to the clock recovery circuit, and a second optical gating device having an input port coupled to a continuous wave (CW) laser and a clock port coupled to the output of the first optical gating device, wherein the optical gating devices may be terahertz optical asymmetric demultiplexers (TOADs).

18 Claims, 2 Drawing Sheets

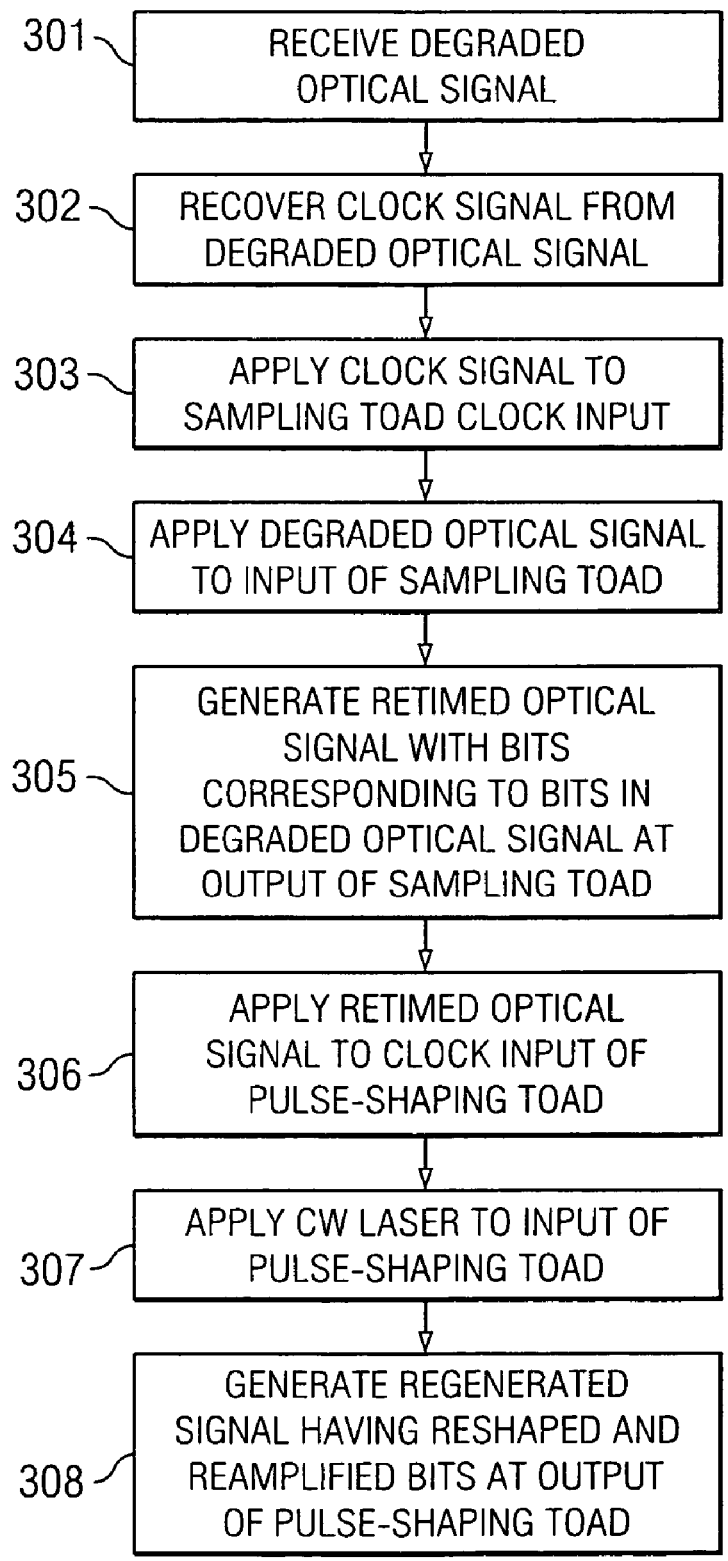

ALL-OPTICAL, 3R REGENERATION USING THE SAGNAC AND MACH-ZEHNDER VERSIONS OF THE TERAHERTZ OPTICAL ASYMMETRIC DEMULTIPLEXER (TOAD)

RELATED APPLICATIONS

This application claims the benefit of U.S. Provisional Application No. 60/432,360, filed Dec. 10, 2002, the disclosure of which is hereby incorporated by reference herein in its entirety.

TECHNICAL FIELD

The present invention is directed generally to regenerating degraded bits in optical signals and, more particularly, to all-optical retiming, reshaping and reamplifying of degraded bits.

BACKGROUND

In long-haul optical transmission systems, signals are typically transmitted at data rates on the order of 10–40 Gb/s. The bits in these signals degrade as the signal travels over the optical fiber. The shape of the bits are attenuated due to fiber loss or fiber dispersion and the timing of bits drifts due to jitter. Before the bits degrade to an unrecoverable point, they must be corrected or regenerated for further transmission.

When a digital optical signal has degraded sufficiently, then 3R regeneration—reamplification, retiming, and reshaping—of the optical pulses is required. In existing systems, optical amplification is provided by erbium-doped fiber amplifiers (EDFA). EDFAs are optical repeater devices that are used to boost the intensity of optical signals being carried through a fiber optic communications system. However, EDFA's are unable to retime or reshape the pulses. Instead, retiming and reshaping of the optical data bits must be performed electronically.

The use of electronics leads to a significant bottleneck in the scalability of the network as well as an exorbitant cost per bit due to the processing required to reshape and retime bits at high data rates. Moreover, each wavelength in the optical signal must be divided out into separate channels and processed by separate electronic circuits. To avoid the cost and complexity of optical-electronic conversion, it would be advantageous to carry out 3R regeneration entirely in the optical domain, thereby eliminating the electronic regeneration bottleneck. However, prior systems do not perform optical reshaping or retiming of data signals.

SUMMARY

The present invention combines two terahertz optical asymmetric demultiplexers (TOADs) to perform the function of an optical 3R regenerator that provides reamplification, reshaping, and retiming of a degraded or distorted optical data signal.

The uniqueness of the present invention is the capability to completely eliminate timing jitters in the optical signal as well as correcting the arbitrary reshaping of the data, regardless of the data format and duty cycle. Two types of optical data format are presently in use in optical networks, return-to-zero (RZ) and non-return-to-zero (NRZ) data. RZ data may also have arbitrary duty cycles, although the duty cycle is usually a small fraction of the bit period as optical pulses carry RZ optical data. The present invention can re-shape and re-time both types of optical data formats. In addition, wavelength conversion capability is inherent in the design.

The invention combines one TOAD that completely eliminates timing jitter followed by a second TOAD that reshapes the output of the first TOAD, the sampling TOAD, into any data format. Optical data entering the sampling TOAD is first sampled by a local optical clock, which can be generated by an optical pulse source, such as, for example, a modelocked erbium doped fiber laser or a gain switched semiconductor laser. Since the location of the sampling is always exact and defined by the local clock, any timing error within the working range of the TOADs can be completely eliminated. The optical data is thus translated by the sampling TOAD into narrow and precisely timed pulses, which are then amplified and injected into the second TOAD, the pulse-shaping TOAD, as the clock input.

The narrow data pulses switch the pulse-shaping TOAD and open a temporal sampling window so that a local continuous wave (CW) laser can pass through the TOAD for the duration of the sampling window. Since the CW laser is generated locally and has a very narrow linewidth, the output of the pulse-shaping TOAD contains very little noise from the original signal. The temporal window of the pulse-shaping TOAD can be controlled so that the output pulse width is an exact replica of the original signal. Thus, at the output of the pulse-shaping TOAD, the regenerated signal contains all the data from the distorted signal, but with the timing errors eliminated and the shape distortions removed. The output pulses are also amplified to compensate for any attenuation in the original signal. In addition, because the CW laser may be of any wavelength, wavelength conversion capability is build into the invention.

The present lack of a viable optical 3R regenerator greatly impedes the development of all optical networks. In addition, current optical 3R regenerators focus on only one optical format, typically NRZ with a few focusing on RZ. With the ability to regenerate both types of optical data formats, the 3R-TOAD can greatly reduce the development cost and system complexity.

By optically regenerating all types of optical data, the invention can help realize the cost benefits of the all multi-wavelength networks by eliminating the need for electronic wavelength converters and 3R regenerators with a single optical 3R regenerator and wavelength converter.

It is an object of the present invention to provide all-optical regeneration of degraded signals at high data rates.

It is a further object of the invention to simultaneously process all wavelengths in a multiplexed optical data signal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

FIG. 3 is a flow chart illustrating the process used in one embodiment of the invention.

DETAILED DESCRIPTION

When an optical digital signal has degraded sufficiently, re-amplification, re-timing and reshaping of the optical pulses are required; this is called "3R regeneration." To avoid the cost and complexity of optical-electronic conversion, it is advantageous to carry out 3R regeneration entirely in the optical domain, eliminating the electronic regeneration bottleneck. By combining two unique capabilities of the TOAD—high bandwidth sampling and precision pulse shaping—the present invention provides an all-optical, 3R regenerator that can completely eliminate any timing jitter in the signal as well amplify and reshape the signal to remove any waveform distortions.

Figure 1:
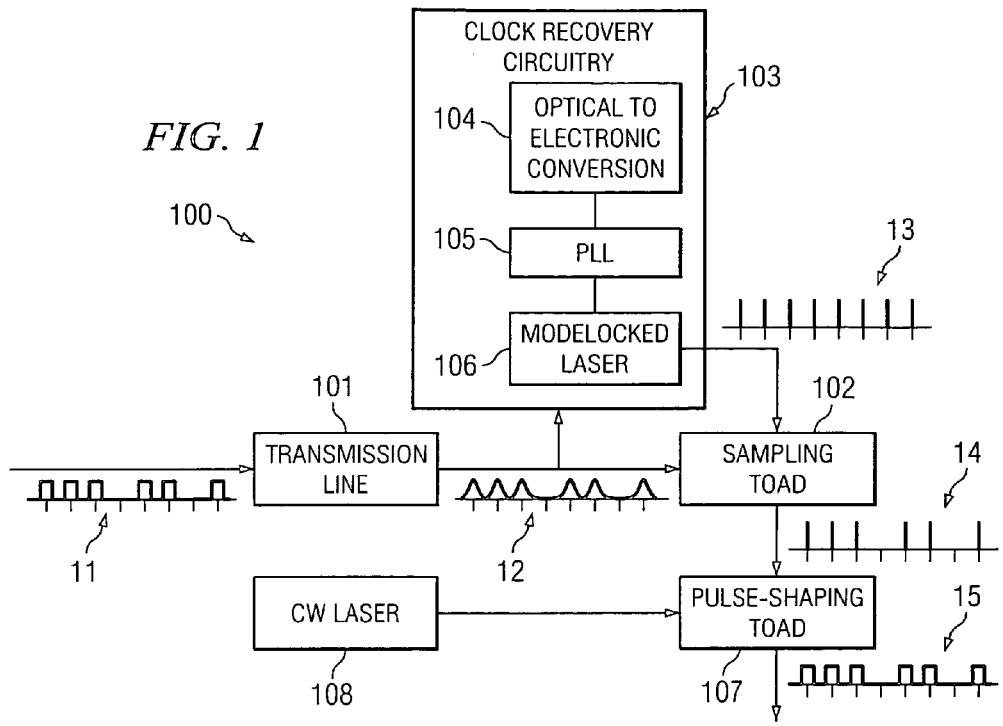
FIG. 1 is block diagram of an exemplary system incorporating embodiments of the invention.

FIG. 1 is block diagram of exemplary system 100 incorporating one embodiment of the invention. Optical data signal 11 represents a signal that is applied to transmission line 101. After some distance, data signal 11 degrades so that the corresponding signal at the end of transmission line 101 looks like data signal 12. The individual pulses in degraded data signal 12 have lost their original rectangular shape and are spread out so that the pulses edges roll off instead of being sharp. Noise effects in transmission cause random timing shifts or "jitter" in the data signal. This degrades the timing of the pulses in degraded signal 12 is shifted from the original pulse timing. The pulses in degraded signal 12 are also attenuated so that the signal strength is not the same as original signal 11. The original information that was sent in data signal 11 can still be recovered from degraded signal 12. However, degraded signal 12 requires regeneration if it is to be transmitted over an additional distance, or the signal will degrade beyond a point at which the original information can be recovered. The present invention provides 3R regeneration—reamplification, reshaping and retiming—for the degraded signal so that it can be transmitted a far greater distance without undergoing electronic 3R regeneration.

Data signals 11 and 12 may be wavelength division multiplexed (WDM) signals comprising multiple channels each having its own light wavelength, however, in order to simplify the exemplary embodiment illustrated in FIG. 1, a single wavelength channel is described.

Degraded signal 12 is applied to the input port of sampling TOAD 102. At the same time, clock recovery circuitry 103 generates a clock signal to be applied to the clock port of sampling TOAD 102. Clock recovery circuitry 103 receives degraded data signal 12 as an input and optical to electronic converter 104 converts signal 12 from a light signal to an electronic signal. The electronic signal is then applied to phase locked loop 105 which detects the phase of degraded signal 12. The output of phase locked loop 105 is applied to the RF control input of modelocked laser 106, which generates pulse train 13. In an alternative embodiment, the clock could be recovered by using all-optical clock recovery.

Modelocked laser 106 produces a train of narrow optical pulses. In one embodiment, the width of the narrow optical pulses is a small fraction of the TOAD switching window. The repetition rate of the pulses is equal to the data rate of signal 12 detected on transmission line 101. For example, if the data signal on transmission line 101 has a data rate of 10 Gb/s, then the output of modelocked laser 106 will also have a 10 Gb/s repetition rate. The phase of pulse train 13 matches the phase applied to the RF control input of modelocked laser 106. Clock recovery circuit 103 adjusts the phase of modelocked laser 106 to match the phase of data signal 12. Mode locked laser 106 may be built with an extremely small timing jitter on the order of less than 25 femtoseconds ($10^{-15}$). Therefore, a modelocked laser provides a very stable clock source. However, those of skill in the art will understand that other optical clock devices now known or later developed, such as a gain switched semiconductor, may be used to provide the local optical clock functionality.

Pulse train 13 is applied as the clock input into sampling TOAD 102. Sampling TOAD 102 acts as an optical shutter in which the input data signal (12) is sampled for each clock pulse (13). The pulses in pulse train 13 correspond generally to the center of the data intervals in data signal 12. The width of the sampling window for TOAD 102 can be adjusted so that for each pulse 13, TOAD 102 samples a portion of the data interval in signal 12. For example, the sample window for TOAD 102 may be adjustable from 1 to 200 picoseconds. The width of TOAD 102's sampling window is selected based upon the system data rate and the noise effects in the system. At higher data rates, the width of the sampling window will be smaller.

The entire original pulse width is typically not sampled, instead typical sample windows are on the order of 10 to 50% of the bit width for the pulses in data signal 11. If the sample window is open too wide, then data bits that have drifted into the wrong interval due to jitter, for example, may be sampled in the wrong interval. In a preferred embodiment, clock pulse train 13 causes sampling TOAD 102 to sample at the middle of the bit interval. As long as some portion of the data bit is present when the sample window is open, it will be sampled. Sampling TOAD 102 produces an output signal of sampled bits at regularly timed intervals. Any logical level that is present in the data signal input (12) when the sampling window opens is passed through to the output of TOAD 102. As a result, the output of TOAD 102 is a series of re-timed pulses 14 that correspond to the timing of the original data signal 11.

Pulses 14 are applied to the clock port of pulse-shaping TOAD 107; and a signal from constant wave (CW) laser 108 is applied to the input port of input of pulse-shaping TOAD 107. The resulting output of pulse-shaping TOAD 107 is regenerated data signal 15. The intensity of CW laser 108 may be varied to adjust the amplification of the output signal. For example, by increasing the CW intensity, the regenerated signal may have a larger amplitude than the input data signal. The CW laser signal also has a very stable, constant amplitude. This shows up in the regenerated signal as pulses that have uniform amplitudes and very flat tops. Thus, the pulses in regenerated signal 15 have been reamplified to their original level or to some other desired level.

Pulse shaping TOAD 107 also reshapes the pules in regenerated signal 15. One characteristic of the sampling window of the TOAD is the extremely sharp edges that have, for example, on the order of 1 picosecond rise/fall times. As a result, the output pulses from TOAD 107, such as the pulses in regenerated data signal 15, have very sharp edges that are created by sample window characteristics. The width of the output pulses is adjustable. In the present invention, the width of the sample window would be selected to match the width of the original pulses in data signal 11. Therefore, the pulses from degraded signal 12 are reshaped and appear in regenerated signal 15 with the same width as the original data bits in data signal 11.

The pulse timing in regenerated data signal 15 matches the timing of the pulses in clock signal 14, which, as discussed above, corresponds to the timing of degrade signal 12 and original data signal 11. Therefore, regenerated data signal 15 has been retimed to match original data signal 11.

Accordingly, system 100 provides 3R regeneration for degraded data signal 12 by reamplifying, reshaping and retiming the data bits into pulses of output data signal 15.

The wavelength of data signal 15 corresponds to the wavelength or color of CW laser 108. CW laser 108 may be a tunable laser or may have a fixed wavelength. This allows the wavelength of output data signal 15 to be adjusted to a desired wavelength, which may be the same wavelength as original data signal 11 or may be a different wavelength. A system operator may desire to change the color of the output data signal, for example, to route the signal or to prevent conflicts with other signals that are later multiplexed together. The changing of the regenerated signal wavelength is essentially a fourth "R"—recoloring—in the regeneration.

Figure 2:
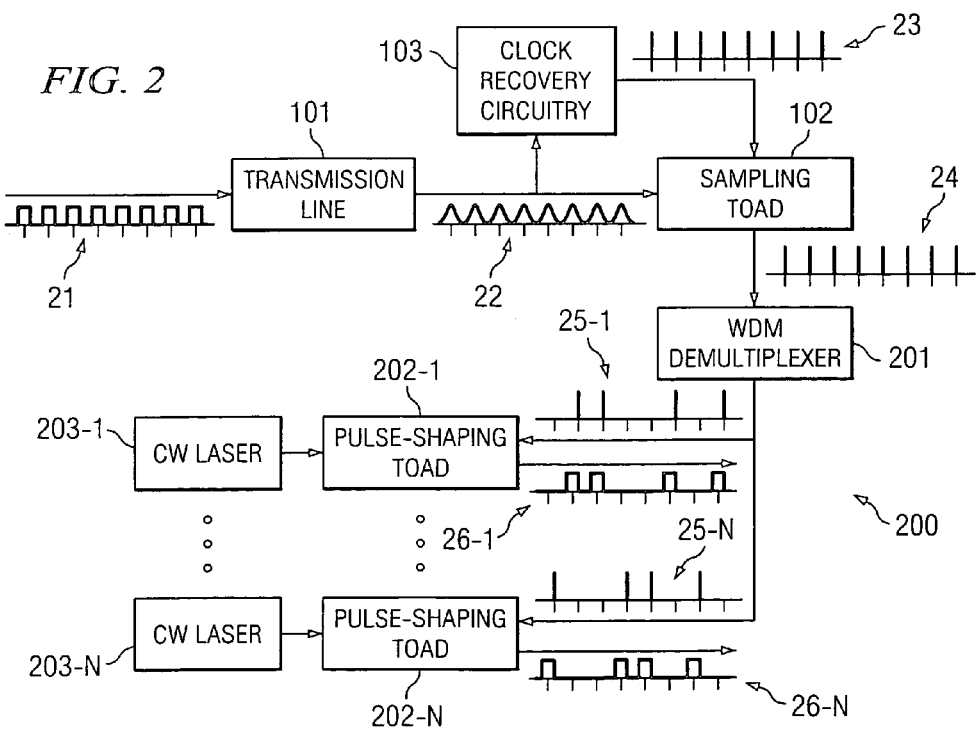
FIG. 2 is a block diagram of system 200 incorporating an alternative embodiment of the invention in which multiple signals at different wavelengths are regenerated.

FIG. 2 is a block diagram of system 200 incorporating an alternative embodiment of the invention in which multiple signals at different wavelengths are regenerated. Similar to the description of FIG. 1, original optical data signal 21 is created and transmitted across fiber transmission line 101. However, data signal 21 is comprised of signals on multiple channels, each channel corresponding to a different color or wavelength and which are synchronously timed with respect to each other. Data signal 21 is degraded while traveling across transmission line 101 and after some distance the data bits are attenuated and lose their shape. Jitter is also introduced into the data signal bits and the timing of the data bits may drift. As a result, original data signal 21 degrades into degraded data signal 22. Clock recovery circuitry 103 receives degraded data signal 22 and recovers the timing information as described above. The timing for each channel or wavelength in original data signal 21 is the same. Because the different wavelength channels experience different propagation delays in the fiber due to material dispersion, re-timing must be performed at an appropriate distance before the differential delay between wavelength channels reaches approximately one-half of a bit interval. If regeneration is performed before the timing of each channel has drifted too far, clock recovery circuitry 103 can generate clock signal 25, which corresponds to the timing for all of the channels in signal 22.

Clock signal 25 is applied to the clock input port of sampling TOAD 102 as described above and degraded data signal 22 is applied to the input port. As described above, the pulses output from sampling TOAD 102 have been retimed to match the timing of original data signal 21. Accordingly, output data signal 24 is a series of narrow pulses that have the same timing as original data signal 21. Retimed output data signal 24 also includes all of the wavelengths from original data signal 21. This is an advantage over existing regeneration systems, which are unable to generate retimed pulses for multiple wavelengths simultaneously.

The individual wavelengths in retimed data signal 24 must be divided out before reshaping and reamplification processing. WDM demultiplexer 201 splits the channels into separate retimed data signals 25-1, 25-N each having a different color or wavelength. Original data signal 21 may include 200 or more separate wavelength signals. "N" retimed data signals 25 are output from WDM demultiplexer 201, wherein N is the number of individual wavelength channels. Each retimed data signal 25-N is applied to the clock port of a separate pulse-shaping TOAD 202-N. A CW laser signal is applied to each of the input ports of pulse-shaping TOADs 202-N.

A separate CW laser 203-N is coupled to each pulse-shaping TOAD 202-N. Each CW laser 203-N generates a unique wavelength signal that is output from pulse-shaping TOAD 202-N as a series of regenerated pulses 26-N that corresponds to one of the channels in original data signal 21. Each regenerated data signal 26-N has been retimed to match the original timing of signal 21. The amplitude of each CW laser 203-N is adjusted to create pulses in regenerated signal 26-N that have a desired amplitude so that the original data signal pulses are reamplified. Furthermore, the sample window of pulse-shaping TOAD 202-N is selected so that the regenerated pulses 26-N have been reshaped. Therefore, each of the individual channels in degraded data signal 22 are regenerated into separate reamplified, reshaped and retimed data signals 26-N. These signals (26-N) may be recombined with a WDM multiplexer and transmitted together again, or regenerated signals 26-N may be routed to different transmission lines (not shown) depending upon their individual destinations.

It will be understood that each individual regenerated channel 26-N may have the same wavelength as its corresponding channel in original data signal 21. Alternatively, depending upon the wavelength of CW laser 203-N, regenerated data signal 26-N may have a wavelength that is different from the corresponding channel in original data signal 21. This allows system 200 to recolor the channels as needed for further routing or processing. In most cases CW laser 203-1 and CW laser 203-N would be set to different wavelengths so that regenerated signals 26-1 and 26-N have different wavelengths and do not interfere with each other. However, if regenerated signals 26-1 and 26-N are going to be routed separately, then CW laser 203-1 and CW laser 203-N may be adjusted to the same color because the output signals will not conflict.

The present invention can be made either from discreet components or it can be integrated on a photomc chip. In the discreet version, the invention consists of two optical loop mirrors with a semiconductor optical amplifier (SOA) placed asymmetrically about the center of each loop. The data pulse enters the first loop through the control port and opens a switching window in the optical regenerator. The output of the first loop is injected into the second loop, which reshapes the data. The components in the discreet version include optical fibers, packaged SOAs with pig-tails, optical fiber power couplers, a CW laser diode for the holding beam, and a local optical clock source. It may also include polarization controllers, tunable delay lines, wavelength fitters, polarization maintaining fibers, and optical amplifiers. Assembly uses standard optical fiber assembly techniques. In the integrated version, any one of many standard photonic processing techniques can be utilized to produce the device. The uniqueness of the device lies in using two TOADs in a specific manner, and this combination can be physically implemented in a variety of ways available to those skilled in the art.

The present invention is useful for regeneration of degraded optical data signals that do not have timing jitter that exceeds the switching window size of the sampling TOAD. Excess timing jitter will be converted to intensity noise at the output. This limits the working range of timing jitter elimination to a value equaling the bit-period of the input data minus two times the rise time of the signal waveform. For example, if the input data stream is at a data rate of 10 Gb/s, and the rise time of the optical signal is 30 picoseconds, then the working range of the regenerator is 40 picoseconds. However, this does not pose a serious limitation. In 3R regeneration, the re-timing focuses on eliminating timing-jitter, a random process, and not dispersion effect, a deterministic process that can be mitigated through dispersion compensation techniques. In eliminating timing jitter, a 40 picosecond working range is more than adequate for most known optical network applications.

The TOAD behaves like an optical AND gate or a fast optical shutter. There are at least two reasons to use the TOAD in the present invention: 1) it is an extremely fast device that is capable of operating at more than 500 Gb/s; and 2) it is an all-optical device that does not require electronic conversion. It will be understood that a filter may be used at the output of the TOAD to eliminate the clock signal. For example, if the clock signal is in a different band than the input signal (i.e. an out-of-band clock signal), then a wavelength filter may be used at the TOAD output to reject the clock signals. Alternatively, an in-band clock may be used if the clock signal has a different polarization. In this case, a polarization filter may be used at the output of the TOAD to reject the clock.

Although the term "TOAD" is used throughout the description, those of skill in the art will recognize that the invention is not limited to a particular terahertz optical asymmetric demultiplexer device. Other semiconductor optical amplifiers in a Sagnac loop mirror may be used. Also, different interferometer configurations may be used, such as the Sagnac or Mach-Zehnder interferometer configurations.

In other embodiments of the invention, other optical gating devices may be used in place of the TOADs shown in the exemplary embodiment. For example, any device that has an optical input, an optical output, and a control input, wherein signals as the control port cause a portion of an input signal to be blocked or passed to the output port during a particular time interval, may be used in the invention. Furthermore, the device must be capable of gating the input signal for time intervals that range in duration from small fractions of the bit period to the duration of the bit period. There are a variety of types of devices and technologies known to those of skill in the art that can implement this function. These devices vary in speed and performance and include electro-optic switches and modulators and all-optical switches and modulators. More specifically, some all-optical switches provide very fast gating times, for example, on the order of one picosecond, that would be required at high data rates. Examples of such all-optical switches include optical interferometric devices having a semiconductor optical amplifier in one or more arms of the interferometer. Other examples include, but are not restricted to, the TOAD, Mach-Zehnder interferometers containing semiconductor optical amplifiers, semiconductor optical amplifiers in a loop mirror, and the SLALOM.

FIG. 3 is a flow chart illustrating the process used in one embodiment of the invention. In block 301, a degraded optical signal is received. The clock signal is recovered from the degraded optical signal in block 302. The clock signal is applied to the clock input of the sampling TOAD at block 303, and the degraded optical signal is applied to the input of the sampling TOAD at block 304. A retimed optical signal is generated at the output of the sampling TOAD at block 305. The data bits in the retimed signal correspond to the bits in the degraded optical signal. The retimed optical signal is applied to the clock input of the pulse-shaping TOAD at block 306, and a CW laser signal is applied to the input of the pulse-shaping TOAD at block 307. The pulse-shaping TOAD generates a regenerated signal at block 308. The regenerated signal has bits that are reshaped and reamplified.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for regenerating optical signals comprising:
recovering a clock signal from a degraded optical signal;
applying the clock signal to a clock port of a first optical gating device;
applying the degraded optical signal to an input port of the first optical gating device;
generating a retimed optical signal at the output of the first optical gating device;
applying the retimed optical signal to the clock input of a second optical gating device;
applying a continuous wave (CW) laser signal to the input of the second optical gating device; and
generating a regenerated optical signal at the output of the second optical gating device.

2. The method of claim 1 wherein data bits in the retimed signal correspond to data bits in the degraded optical signal.

3. The method of claim 1 wherein data bits in the regenerated optical signal are reshaped and reamplified data bits from the degraded optical signal.

4. The method of claim 1 wherein recovering a clock signal from a degraded optical signal further comprises:
converting the degraded optical signal to an electronic signal;
detecting the phase of the electronic signal in a phase locked loop;
applying an output of the phase locked loop to a control input of modelocked laser;
generating the clock signal at the output of the mode locked laser.

5. The method of claim 1 wherein recovering a clock signal from a degraded optical signal further comprises:
generating the clock signal using a gain switched semiconductor.

6. The method of claim 1 wherein at least one of the optical gating devices comprise a device selected from the group consisting of:
a terahertz optical asymmetric demultiplexer (TOAD);
a semiconductor optical amplifier in a Sagnac loop mirror;
a semiconductor optical amplifier with a Mach-Zehnder interferometer; and
a SLALOM.

7. The method of claim 1 further comprising:
adjusting a wavelength of the CW laser depending upon how the regenerated optical signal is to be routed.

8. A system for regenerating optical signals comprising:
a clock recovery circuit coupled to a transmission line;
a first optical gating device having an input port coupled to the transmission line and a clock port coupled to the clock recovery circuit; and
a second optical gating device having an input port coupled to a continuous wave (CW) laser and a clock port coupled to the output of the first optical gating device.

9. The system of claim 8 wherein at least one of the optical gating devices are selected from the group consisting of:
a terahertz optical asymmetric demultiplexer (TOAD);
a semiconductor optical amplifier in a Sagnac loop mirror;
a semiconductor optical amplifier with a Mach-Zehnder interferometer; and
a SLALOM.

10. The system of claim 8 wherein the clock recover circuit further comprises:
an optical to electronic signal conversion circuit coupled to the transmission line;
a phase locked loop circuit coupled to an output of the conversion circuit; and
a modelocked laser coupled to an output of the phase locked loop.

11. The system of claim 8 further comprising:
an optical demultiplexer coupled between the first and second optical gating devices.

12. The system of claim 11 further comprising a plurality of optical gating devices coupled to the output of the optical demultiplexer, wherein each of the plurality of optical gating devices receives signals of a different wavelength from the demultiplexer.

13. The system of claim 12 further comprising:
a plurality of CW lasers, each CW laser coupled to one of the optical gating devices.

14. A method of regenerating optical signals comprising:
simultaneously receiving a plurality of channels over an optical transmission medium;
extracting a clock timing signal from the channels;
providing the plurality of channels and the clock timing signal as inputs to a first a terahertz optical asymmetric demultiplexer (TOAD);
generating a plurality of retimed signals from the first TOAD, wherein each of the retimed signals correspond to one of the plurality of channels;
demultiplexing the retimed signals into a plurality of separate signals;
providing one of the plurality of separate signals and one of a plurality of continuous wave (CW) laser signals as inputs to one of a plurality of second TOADs;
generating reshaped and reamplified signals at the output of the second TOADs, wherein each of the reshaped and reamplified signals has a wavelength corresponding to a corresponding one of the plurality of CW laser signals.

15. The method of claim 14 wherein each of the plurality of channels has a different wavelength.

16. The method of claim 15 wherein information bits in each of the reshaped and reamplified signals correspond to degraded bits in the plurality of channels received over the optical transmission medium.

17. The method of claim 15 wherein at least one of the reshaped and reamplified signals has the same wavelength as a corresponding channel in the plurality of channels received over the optical transmission medium.

18. The method of claim 15 wherein a wavelength of at least one of CW lasers is adjusted so that one of the reshaped and reamplified signals a wavelength different from a corresponding channel in the plurality of channels received over the optical transmission medium.

* * * * *

UNITED STATES PATENT AND TRADEMARK OFFICE
CERTIFICATE OF CORRECTION

| | | |
|---|---|---|
| PATENT NO. | : 7,035,550 B2 | Page 1 of 1 |
| APPLICATION NO. | : 10/732171 | |
| DATED | : April 25, 2006 | |
| INVENTOR(S) | : Paul R. Prucnal et al. | |

It is certified that error appears in the above-identified patent and that said Letters Patent is hereby corrected as shown below:

Col. 1 line 5 insert

-- GOVERNMENT LICENSE RIGHTS

The U.S. Government has a paid-up license in this invention and the right in limited circumstances to require the patent owner to license others on reasonable terms as provided by the terms of grant number F30602-00-2-0501 awarded by the Defense Advanced Research Projects Agency. --

Signed and Sealed this

Nineteenth Day of September, 2006

JON W. DUDAS
*Director of the United States Patent and Trademark Office*